United States Patent [19]

Lee

[11] Patent Number: 5,134,510

[45] Date of Patent: Jul. 28, 1992

[54] INFORMATION TRANSMITTING SYSTEM USING TELEVISION LUMINANCE SIGNAL

[75] Inventor: Kap-Soo Lee, Seoul, Rep. of Korea

[73] Assignee: Samsung Electronics Co., Ltd., Suweon, Rep. of Korea

[21] Appl. No.: 450,424

[22] Filed: Dec. 14, 1989

[30] Foreign Application Priority Data

Jul. 26, 1989 [KR] Rep. of Korea ............... 89-10743

[51] Int. Cl.⁵ .................. H04N 7/08; H04N 17/00
[52] U.S. Cl. .................................... 358/142
[58] Field of Search ............ 358/139, 22, 10, 105, 358/142

[56] References Cited

U.S. PATENT DOCUMENTS

| | | |
|---|---|---|
| 4,249,212 | 2/1981 | Ito et al. ............... 358/22 |
| 4,504,851 | 3/1985 | Janko et al. ............ 358/139 |
| 4,694,329 | 9/1987 | Belmares-Sarabia et al. ...... 358/105 |

Primary Examiner—Leo H. Boudreau
Assistant Examiner—Wendy R. Greening
Attorney, Agent, or Firm—Robert E. Bushnell

[57] ABSTRACT

This invention provides an information transmitting system using television luminance signal, including a data detecting stage for detecting data according to the change of amplitude of a luminance signal by comparing the level of the luminance signal averaged in one field of one frame with that of the luminance signal in another field after separating and averaging the luminance signal of television signal, and a data processing stage for processing the data extracted by said data detecting stage. By carrying out the character information transmission, easy data-receiving without an additional receiving system may be attained and applied to the conventional TV at low price by virtue of the simple circuit composition may be possible according to the present invention.

21 Claims, 1 Drawing Sheet

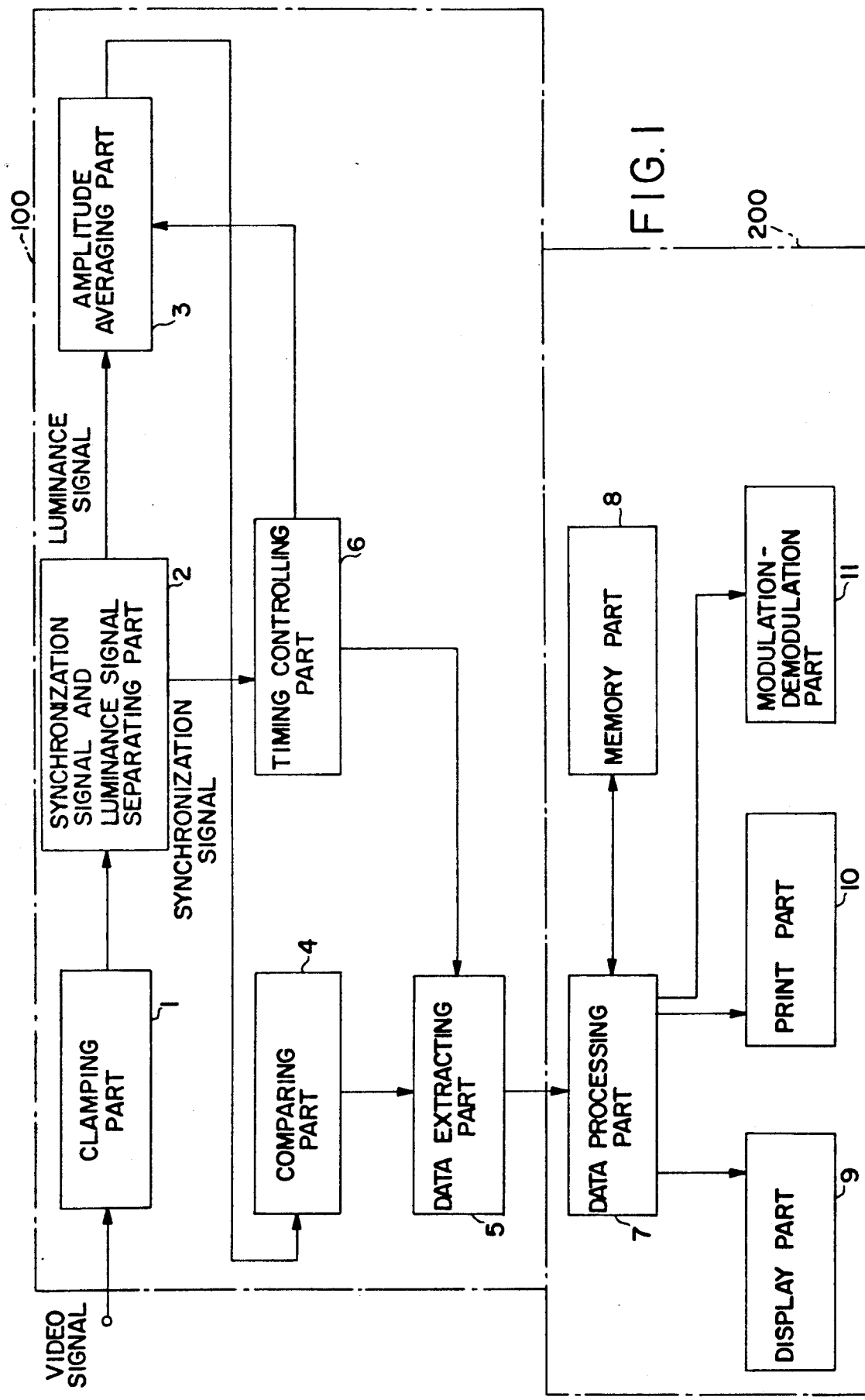

INFORMATION TRANSMITTING SYSTEM USING TELEVISION LUMINANCE SIGNAL

BACKGROUND OF THE INVENTION

The present invention relates to a television, particularly to an information transmitting system using a television luminance signal, which can transmit various items of information by using the luminance signal of television signals and also receive and then display on CRT screen.

Generally, a teletext has been widely used as the information transmitting means using television signals. The teletext detects and displays the transmitted character information signal such as weather forecast and stock quotations, which are inserted during the interval of the vertical retrace line on the television scanning.

But, the teletext can't easily extract the character information signal from television signals since the teletext must have a complex circuit to separate it from the television signals, or the ghost phenomenon due to the reflected electric wave in the receiver or a failure of impedance matching for transmission lines can occur. In the area that the ghost phenomenon occurs, the use of the teletext is not possible, thereby requiring an additional receiver for teletext.

SUMMARY OF THE INVENTION

The present invention has been made in consideration of this and has for one object to provide an information transmitting system using the luminance signal of television signals, which can transmit the information by inserting it into the luminance signal and detect it again.

Another object is to provide an information transmitting system using television luminance signals, which is simply designed to be easily and widely used in the television.

According to the present invention, there is provided an information transmitting system using television luminance signals. This system has a data detecting stage for detecting data according to the change of amplitude of a luminance signal by comparing the level of the luminance signal averaged in one field of one frame with that of the luminance signal in another field after separating and averaging the luminance signal of television signals, and a data processing stage for processing the data extracted by the data detecting stage, and for storing and displaying the processed data.

BRIEF DESCRIPTION OF THE DRAWING

FIG. 1 is a block diagram representing an information transmitting system using the television luminance signal according to this invention.

DETAILED DESCRIPTION OF THE INVENTION

The present invention will be now described in more detail with reference to an accompanying drawing.

FIG. 1 is a block diagram of an embodiment representing an information transmitting system using the television luminance signal, which uses a data detecting stage 100 for detecting the information within the luminance signal of the video signals transmitting the character information by changing the amplitude of the luminance signal and a data processing stage 200 for processing the detected data of the output terminal of the data detecting stage 100.

First, the data detecting stage 100 includes a clamping part 1, a synchronization and luminance signal separating part 2, an amplitude averaging part 3 for a luminance signal, a comparing part 4, a data extracted part 5, and a timing controlling part 6.

In the data detecting means 100, the clamping part 1 to clamp a mixed video signal consisting of the video signal and character information signal to the constant level is connected to the input terminal for the video signal.

Next, the synchronization and luminance signal separating part 2 to separate the video signal clamped to the constant level into a synchronization signal and a luminance signal, is connected to the output terminal of the clamping part 1 in the data detecting means 100.

The luminance signal separated from the synchronization and luminance separating part 2 is applied to the amplitude averaging part 3 to average the amplitude of the luminance signal.

Also, the comparing part 4 to compare the luminance signal averaged in one field of one frame by the amplitude averaging part 3 with the luminance signal averaged in another field is connected to the output terminal of the amplitude averaging part 3 in the data detecting stage 100.

The output terminal of the comparing part 4 is connected to the data extracting part 5. This data extracted part 5 extracts the data as high level when the luminance signal averaged in one field of one frame by the amplitude averaging part 3 is larger than the luminance signal averaged in another field, but if not, extracts it as low level. On the other hand, the separated synchronization signal through the synchronization and luminance signal separating part 2 is provided to the timing controlling part 6 of for which an output terminal is connected to both the amplitude averaging part 3 and the data extracting part 5.

Thus, the separated synchronization signal through the synchronization and luminance signal separating part 2 is applied to the timing controlling part 6 so that the amplitude averaging part 3 is synchronized with the data extracting part 5 by the timing controlling part 6.

Second, the data processing stage 200 includes a data processing part 7, a memory part 8, a display part 9, a print part 10, and a modulated-demodulation part. In the data processing stage 200 connected to the data detecting stage 100, the data processing part 7 is connected to the output terminal of the data extracting part 5 in the data detecting stage 100.

The output data of the data processing 7 are provided to the memory part 8 to store the output data, the display part 9 to display, the print part 10 to print, and to the modulation-demodulation part to transmit the output data to other terminals.

In such a composition according to the present invention, the applied video signal includes the luminance signal of which amplitude is already changed by the data to be transmitted from a broadcasting station. This video signal is provided to the clamping part 1 in the data detecting stage 100 and clamped to the constant level. Next, the synchronization and luminance signal separating part 2 separates the video signal into the synchronization signal and luminance signal.

That is, the clamped video signal in the clamping part 1 is separated into the synchronization signal and the luminance signal by the synchronization and luminance signal separating part 2. At this time, after the separated luminance signal is applied to the amplitude averaging part 3 in order to average its amplitude, and the average amplitude of the luminance signal is applied to comparing part 4.

On the other hand, the separated synchronization signal is applied to the timing controlling part 6 in the data detecting stage 100 so that the amplitude averaging part 3 is synchronization with the data extracting part 5. The comparing part 4 in the data detecting stage 100 compares the level of the luminance signal of another field with that of the received luminance signal. If the level of the luminance signal received and averaged in one field of one frame is larger than that of the luminance signal of another field, the data "1" is provided. But if not, the data "0" is provided.

These data according to the change of the amplitude of the luminance signal are extracted by the data extracting part 5 in the data detecting stage 100. That is, the data extracting part 5 in the data detecting stage 100 extracts 1 bit data per one frame according to the change of the amplitude of the continuously applied luminance signal.

The extracted data by the data extracting part 5 in the data detecting stage 100 are applied to the data processing part 7 in the data processing stage 200. The processed data in the data processing part 7 are stored in the memory part 8. Also, the processing data are provided to the display part 9, the print part 10, and the modulation-demodulation part 11. Thus, the transmitted data as the amplitude change of the luminance signal are extracted after being compared with the level of the conventional luminance signal of another field, and they are stored in the memory. The data are printed through the print part 10 and are transmitted to the other terminals through the modulation-demodulation part.

As mentioned above, the present invention can carry out the character information transmission using the television signal by changing the amplitude of the luminance signal and transmitting 1 bit of data per one frame. The data-receiving is easy even through there is the ghost phenomenon so that an additional receiving system is not needed. Also, the circuit composition is very simple, so it is applicable to the conventional television at a low price.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications of embodiments as fall within the true scope of the invention.

What is claimed is:

1. An information transmitting system using television luminance signals, comprising:
    data detecting means for detecting data according to the change of amplitude of luminance signals by comparing the level of a luminance signal averaged in one field of one frame with that of a luminance signal in another field after separating and averaging the luminance signals of television video signals; and
    data processing means for processing the data extracted by said data detecting means to obtain visibly displayable character data, and for storing and displaying the visibly displayable teletext data.

2. An information-transmitting system using television luminance signals according to the claim 1, wherein said data detecting means includes:
    a clamping part for clamping video signals having changes in amplitude to constant voltage levels,
    a synchronization and luminance signal separating part for separating synchronization signals and luminance signals from the clamped video signals,
    an amplitude averaging part for averaging the amplitude of the luminance signals separated by the synchronization and luminance signal separating part,
    a comparing part for providing intermediate signals by comparing the level of one of the luminance signals averaged in one field of one frame with that of another of the luminance signals in another field,
    a data extracting part for extracting the data from said intermediate signal, and
    a timing controlling part for synchronizing the amplitude part with the data extracting part.

3. An information transmitting system using television luminance signals according to claim 1, wherein said data processing means includes:
    a memory part for storing the visibly displayable data,
    a display part for displaying the data,
    a print part for printing the data, and
    a modulation-demodulation part for transmitting the data to other terminals.

4. An information transmitting system using television luminance signals according to claim 1, wherein said data detecting means includes:
    synchronization and luminance signal separating means for separating synchronization signals and luminance signals from the video signals;
    amplitude averaging means for averaging the amplitude of the luminance separated by the synchronization and luminance signal separating means;
    comparing means for providing intermediate signals by comparing the level of one of the luminance signals averaged in one field of one frame with the level of one of the luminance signals in another field and for generating intermediate signals exhibiting one logic state when the level of the one of the luminance signals averaged in said one field of said one frame is greater than the level of the one of the luminance signals in said other field, and exhibiting a second logic state when the level of the luminance signal in said one field of said one frame is less than the level of the luminance signal in said other field; and
    data extracting means for extracting the visibly displayable teletext data from said intermediate signals.

5. The system of claim 1, wherein said data detecting means generates said data extracted having a first logical value when the comparison detects a difference between said average of the amplitude of the luminance signal component of one field within one of said frames and the average of the amplitude of the luminance signal component of the other field, and exhibits a second and different logical value when said comparing detects no difference between the average of the luminance signal component of one field within one of said frames and the average of the amplitude of the luminance signal component of the other field.

6. An information transmitting system using television luminance signals comprising:
    data detecting means for separating and averaging luminance signals within successive frames of video signals, and for providing detected data by detecting data indicative of changes of amplitude of said luminance signals by comparing the average amplitudes of said luminance signals in one field of one frame with average amplitudes of one of said luminance signals averaged in another field; and data processing means for providing processed data in dependence upon the detected data extracted by said data detecting means; and means for providing visible teletext characters corresponding to said processed data.

7. An information-transmitting system using television luminance signals according to claim 6, wherein said data detecting means includes:

clamping means for clamping video signals to constant voltage levels, means for separating synchronization signals and luminance signals from the clamped video signals, amplitude averaging means for averaging the amplitudes of the luminance signals separated by the separating means, comparing means for providing intermediate signals by comparing the level of the luminance signal averaged in one field of one frame with the level of the luminance signal averaged in another field, data extracting means for extracting the detected data from said intermediate signals, and timing controlling means for synchronizing the amplitude averaging means with the data extracting means.

8. An information transmitting system using television luminance signals according to claim 6, wherein said data detecting means comprises:

means for providing averages of amplitudes of fields within said frames of video signals;

comparatory means for performing a comparison of an average of the amplitude of the luminance signal component of one field of said frames with another field; and data extraction means for providing said detected data in dependence upon said comparison;

wherein said data extraction means generates intermediate signals exhibiting a first state when said comparison detects a difference between said average of the amplitude of the luminance signal component of one field within said one of said frames and the average of the amplitude of another field, and exhibiting a second state when said comparison detects no difference between said average of the amplitude of the luminance signal component of one field of within one of said frames and the other field.

9. The system of claim 6, wherein said data detecting means generates said detected data with a bit of said detected data having a first logical value when said comparing detects a charge between said average of the amplitude of the luminance signal component of one field within one of said frames and the other field, and exhibits a second and different logical value when said comparing detects no change between the average of the luminance signal component of one field within one of said frames and the other field.

10. An information processor, comprising:

means for receiving video signals containing successive frames of image signals;

means for making comparisons between characteristics of one field of one frame of the image signals with a different field of said image signals, and for generating data signals in dependence upon said comparisons; and means for displaying visible teletext characters corresponding to said data signals.

11. The processor of claim 10, further comprised of: said receiving means receiving video signals having synchronization signal components and luminance signal components, with said luminance signal components containing said successive frames of image signals;

means for separating said synchronization signals and said luminance signals from said video signals; and means for obtaining averages of one of said characteristics for each of said frames of image signals;

wherein said means for making said comparisons operates upon said averages to make said comparisons.

12. The processor of claim 10, further comprised of said means for making said comparisons, performing said comparisons between amplitudes of luminance signals in adjoining fields of said frames of image signals.

13. The process of claim 10, further comprised of means for generating information signals in response to each occurrence of change between said characteristics indicated by said data signals.

14. The system of claim 10, wherein said means for making comparisons comprises:

means for providing averages of amplitudes of luminance signal component of fields within said frames of image signals;

comparatory means for performing a comparison of an average of the amplitude of the luminance signal component of field one of said frames with the average of the amplitude of the luminance signal component of another field; and data extraction means for providing said data signals in dependence upon said comparison.

15. The system of claim 14, wherein said data extraction means generates intermediate signals exhibiting a first state when said comparison detects a difference between said average of the amplitude of the luminance signal component of one field within said one of said frames and the average of the amplitude of the luminance signal component of another field, said exhibiting a second state when said comparison detects no difference between said average of the amplitude of the luminance signal component of one field within one of said frames and the average of the amplitude of the luminance signal component of the other field.

16. The system of claim 14, wherein said data extraction means generates intermediate signals having a first logical value when said comparison detects a difference between said average of the amplitude of the luminance signal component of one field within one of said frames and the average of the amplitude of the luminance signal component of the other field, and exhibits a second and different logical value when said comparison detects no difference between the average of the luminance signal component of one field within one of said frames and the average of the amplitude of the luminance signal component of the other field.

17. The system of claim 14, wherein said data extraction means generates intermediate signals having a first logical value when said comparison detects a change between said average of the amplitude of the luminance signal component of one field within one of said frames and the average of the amplitude of the luminance signal component of the other field, and exhibits a second and different logical value when said comparison detects no change between the average of the luminance signal component of one field within one of said frames and the other field.

18. The system of claim 11, wherein said means for making comparisons comprises:
comparatory means for performing a comparison of an average of the amplitude of the luminance signal component of one field of said frames with the average of the amplitude of the luminance signal component of another field; and
data extraction means for providing said data in dependence upon said comparison.

19. The system of claim 18, wherein said data extraction means generates intermediate signals exhibiting a first state when said comparison detects a difference between said average of the amplitude of the luminance signal component of one field within said one of said frames and the average of the amplitude of the luminance signal component of another field, and exhibiting a second state when said comparison detects no difference between said average of the amplitude of the luminance signal component of one field within one of said frames and the average of the amplitude of the luminance signal component of the other field.

20. The system of claim 18, wherein said data extraction means generates intermediate signals having a first logical value when said comparison detects a difference between said average of the amplitude of the luminance signal component of one field within one of said frames and the average of the amplitude of the luminance signal component of the other field, and exhibits a second and different logical value when said comparison detects no difference between the average of the luminance signal component of one field within one of said frames and the average of the amplitude of the luminance signal component of the other field.

21. The system of claim 18, wherein said data extraction means generates intermediate signals having a first logical value when said comparison detects a change between said average of the amplitude of the luminance signal component of one field within one of said frames and the average of the amplitude of the luminance signal component of the other field, and exhibits a second and different logical value when said comparison detects no change between the average of the luminance signal component of one field within one of said frames and the average of the amplitude of the luminance signal component of the other field.

* * * * *

UNITED STATES PATENT AND TRADEMARK OFFICE
CERTIFICATE OF CORRECTION

PATENT NO. : 5,134,510

DATED : 28 July 1992

INVENTOR(S) : Kap-Soo LEE

It is certified that error appears in the above-identified patent and that said Letters Patent is hereby corrected as shown below:

Claim 5, Column 4, Line 53, delete "the".

Claim 9, Column 5, Line 54, change "charge" to --change--.

Claim 15, Column 6, Line 42, Change "said" to --and--.

Signed and Sealed this

Thirteenth Day of October, 1992

Attest:

DOUGLAS B. COMER

Attesting Officer

Acting Commissioner of Patents and Trademarks